United States Patent
Tsui et al.

(10) Patent No.: US 7,158,813 B2
(45) Date of Patent: Jan. 2, 2007

(54) ANTENNA FOR WIRELESS SYSTEMS

(75) Inventors: Ernest T. Tsui, Cupertino, CA (US); Jeffrey C. Harp, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 09/896,829

(22) Filed: Jun. 28, 2001

(65) Prior Publication Data

US 2003/0003959 A1 Jan. 2, 2003

(51) Int. Cl.
*H04M 1/00* (2006.01)

(52) U.S. Cl. ............... 455/562.1; 455/446; 455/561; 455/422.1

(58) Field of Classification Search ............ 455/561, 455/562, 447, 456, 33.1, 452, 562.1, 450, 455/67.1, 423; 343/719, 761, 781; 370/342, 370/345, 480, 352
See application file for complete search history.

(56) References Cited

U.S. PATENT DOCUMENTS

| | | | | |
|---|---|---|---|---|
| 4,327,417 A * | 4/1982 | Zaczek | .................... | 703/2 |
| 4,687,445 A * | 8/1987 | Williams | .................... | 343/719 |
| 4,845,504 A * | 7/1989 | Roberts et al. | ............. | 342/457 |
| 5,175,551 A * | 12/1992 | Rubin | .................... | 342/26 D |
| 5,603,083 A * | 2/1997 | Lee | ............................ | 455/561 |
| 5,649,292 A * | 7/1997 | Doner | ........................ | 455/447 |
| 5,751,250 A * | 5/1998 | Arntz | ........................ | 342/373 |
| 5,987,037 A * | 11/1999 | Gans | ........................... | 370/480 |
| 6,151,310 A * | 11/2000 | Dent | ............................ | 370/330 |
| 6,201,801 B1 * | 3/2001 | Dent | ............................ | 370/342 |
| 6,204,822 B1 * | 3/2001 | Cardiasmenos et al. | .... | 343/761 |
| 6,205,337 B1 * | 3/2001 | Boch | ............................ | 455/447 |
| 6,215,120 B1 * | 4/2001 | Gadeken et al. | ............. | 250/256 |
| 6,243,427 B1 * | 6/2001 | Stockton et al. | ............. | 375/308 |
| 6,360,107 B1 * | 3/2002 | Lin et al. | .................. | 455/562.1 |
| 6,377,802 B1 * | 4/2002 | McKenna et al. | ............ | 455/430 |
| 6,421,542 B1 * | 7/2002 | Sandler et al. | ............... | 455/561 |
| 6,456,610 B1 * | 9/2002 | Briley | ........................ | 370/337 |
| 6,463,301 B1 * | 10/2002 | Bevan et al. | ............. | 455/562.1 |
| 6,487,417 B1 * | 11/2002 | Rossoni et al. | ........... | 455/67.16 |
| 6,751,442 B1 * | 6/2004 | Barrett | ..................... | 455/11.1 |
| 6,900,775 B1 * | 5/2005 | Shapira | ..................... | 343/844 |
| 2001/0036843 A1 * | 11/2001 | Thompson | ................... | 455/562 |
| 2001/0046865 A1 * | 11/2001 | Hildebrand et al. | ......... | 455/447 |
| 2002/0141382 A1 * | 10/2002 | Winther et al. | .............. | 370/352 |
| 2002/0146983 A1 * | 10/2002 | Scherzer et al. | ............ | 455/67.1 |
| 2002/0159405 A1 * | 10/2002 | Garrison et al. | ............ | 370/328 |
| 2002/0177447 A1 * | 11/2002 | Walton et al. | ............... | 455/452 |
| 2003/0073463 A1 * | 4/2003 | Shapira | ....................... | 455/562 |

* cited by examiner

*Primary Examiner*—Matthew D. Anderson
*Assistant Examiner*—Tan Trinh
(74) *Attorney, Agent, or Firm*—Fish & Richardson P.C.

(57) ABSTRACT

A base station for a wireless communication system has an antenna system that provides a downstream transmit pattern partitioned into azimuthal sectors and an upstream receive pattern partitioned into azimuthal sectors and elevation sectors. The base station has a transmitter connected to the antenna system to transmit a signal to a subscriber using the downstream transmit pattern, and a receiver connected to the antenna system for receiving a signal from the subscriber using the upstream receive pattern.

51 Claims, 4 Drawing Sheets

ANTENNA FOR WIRELESS SYSTEMS

TECHNICAL FIELD

This invention relates to a wireless communication system, and more particularly to an antenna for a wireless communication system.

BACKGROUND

One example of a wireless communication system is a Multi-channel Multi-point Distribution System ("MMDS"), which offers broadband data and voice transmission over a terrestrial microwave platform. MMDS can deliver, for example, multi-channel television programming, Internet access and content, voice communications, data transfer services, and other interactive services. MMDS typically operates in the 2.5 GHz band in North America and in the 3.5 GHz band in international markets. Also, the United States Federal Communications Commission ("FCC") has allocated the 27.5 to 29.5 GHz band to Local Multi-point Distribution Services ("LMDS"). Signals typically are transmitted within a line of sight ("LOS") from a base station transmit antenna to a subscriber's receive antenna ("downstream" transmission), and from a subscriber's transmit antenna to a base station's receive antenna ("upstream" transmission).

Wireless communication systems, such as, for example, MMDS, are well suited to serve the small office/home office ("SOHO"), telecommuter, and small business market, although they may be used in other markets, such as residential, medium business and large business. Wireless communication systems also are well suited to provide communication services to remote and difficult to reach locations.

At present, broadband wireless communication systems, including those in the MMDS band, depend upon antenna height to allow reasonable coverage of large areas with a small number of base stations. Base station antennas may be placed, for example, on mountain tops, tall buildings, or towers such as, for example, existing cellular towers.

Presently, base station antennas typically use omni-directional, cardioid antenna patterns for downstream transmission and azimuthally-sectored antenna patterns for upstream transmission reception. The increased gain of the sectorized upstream antenna pattern helps to balance the signal-to-noise ratio ("SNR") margins between the upstream and downstream cases due, at least in part, to differences between the transmit power of the base station and the transmit power of the subscriber.

The capacity of each base station is limited by a number of factors. For example, the downstream capacity may be limited by the absence of frequency re-use. The upstream capacity may be limited, for example, by available RF bandwidth, spectrally inefficient modulation, and low transmit power at the subscriber transmitter. At present, each base station is limited to approximately 10,000 subscribers.

Current wireless communication systems, including MMDS systems, require complex installation procedures due to the need for a clear LOS from the subscriber location to the base station antenna. Service providers must perform time consuming pre-installation site surveys to assure that the LOS condition is met. However, it is frequently not possible to provide a clear LOS to every subscriber. For example, in the San Francisco Bay area, only approximately 40% of the requested installations can be performed. The installations which proceed are very costly because they require carefully positioned and pointed antennas at both the base station and the subscriber location. Typically, the antenna at the subscriber location must be positioned outdoors, typically high up on a roof or tower, and associated grounding and wiring must be run inside.

DESCRIPTION OF DRAWINGS

Like reference symbols in the various drawings indicate like elements.

DETAILED DESCRIPTION

Wireless communication systems may employ a cellular concept in which a given service area is subdivided into multiple cells. Service to each cell is typically covered by a base station. Each base station normally uses only a fraction of the total number of frequency channels available to the entire wireless communication system. The base stations in nearby cells typically are assigned different groups of frequency channels, and all of the available frequency channels typically are assigned to a relatively small number of base stations. For example, a cluster of N cells may be used to complete the set of available frequencies. N is the frequency reuse factor of the system, where each cell within a cluster typically is assigned 1/N of the total available frequency channels in the system.

Assigning different groups of frequency channels to neighboring base stations helps to minimize interference. The available frequencies may be reused when covering larger areas by designing the system such that cells using the same group of frequency channels do not interfere with each other beyond tolerable limits.

Figure 1:
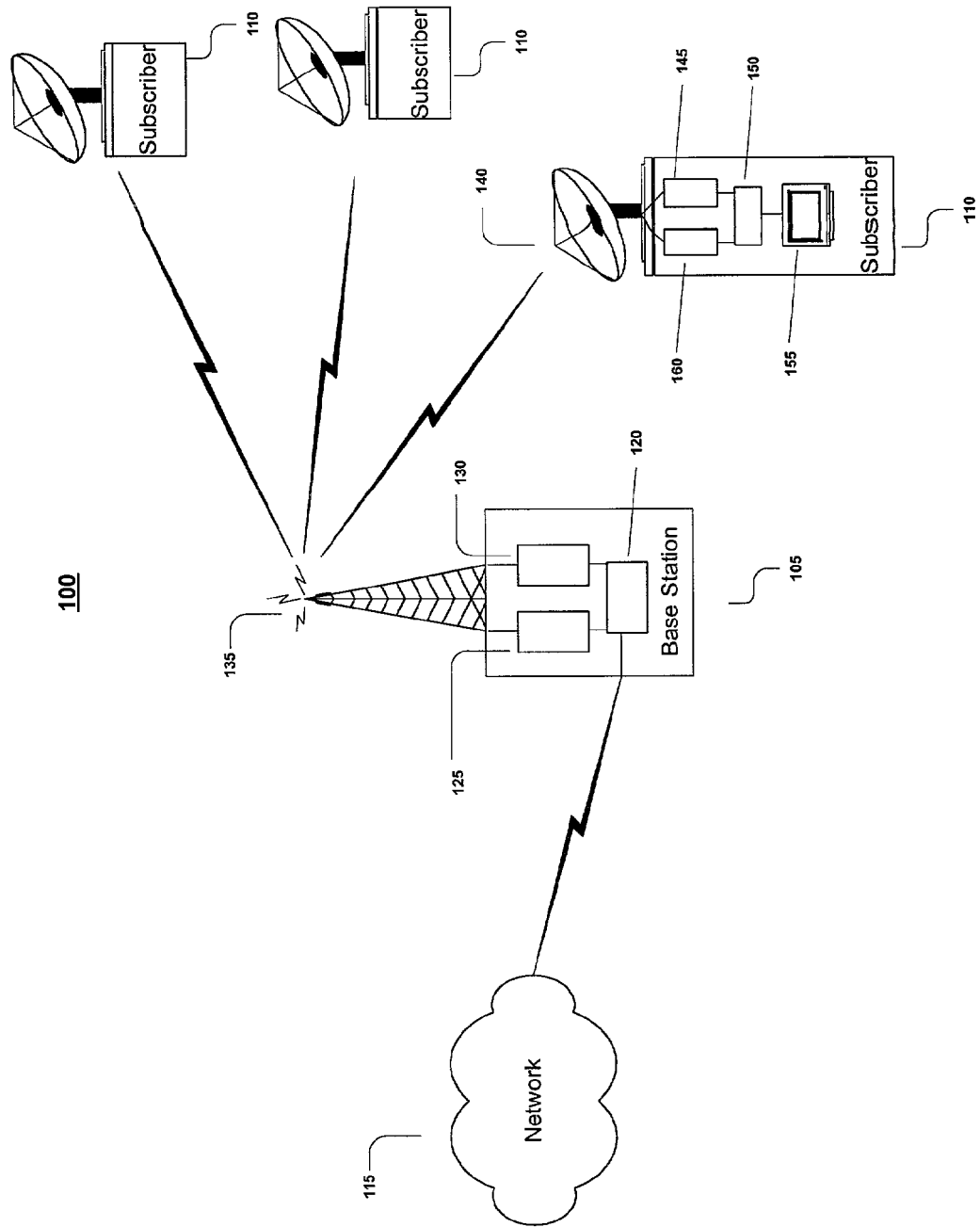
FIG. 1 is a diagram of a wireless communication system.

A typical setup of a wireless communication system 100, such as a MMDS system, is shown in FIG. 1. The wireless communication system 100 typically has at least one base station 105. Each base station 105 typically serves one or more subscribers 110. In a fixed wireless communication system, the subscribers 110 are stationary, whereas the subscribers 110 are capable of changing location in a mobile wireless communication system.

Information to be sent downstream to a subscriber may be routed to the base station 105 through a network 115. The information may include data such as, for example, analog data, digital data, voice, or television signals. The network 115 may include any of the various mechanisms known for delivering data. For example, the network 115 may include analog or digital wired and wireless telephone networks, such as, for example, public switched telephone networks ("PSTN"), integrated services digital networks ("ISDN"), all types of digital subscriber lines ("xDSL"), advanced mobile telephone service ("AMPS"), global system for mobile communications ("GSM"), Synchronous Optical Network ("SONET") ring network or long distance fiber backbones. The network 115 also may include the Internet, the World Wide Web, one or more local area networks ("LANs") and/or one or more wide area networks ("WANs"), radio, cable, satellite, and/or any other delivery mechanism for carrying data. The base station 105 will transmit the information downstream to the subscriber 110. Likewise, information sent upstream from the subscriber 110 to the base station 105 may be routed though the network 115 to the final destination.

The base station 105 may include signal processing equipment 120, a transmitter 125, a receiver 130, and an antenna 135. The signal processing equipment 120 receives from the network 115 the data that are to be sent downstream to a subscriber 110. The signal processing equipment 120 may perform, for example, demodulation, modulation, frequency conversion, encryption, decryption, or other actions to prepare a signal for transmission by a transmitter. The signal processing equipment 120 is connected to a transmitter 125, which may, for example, amplify the signal or perform modulation.

The transmitter 125 may be a dedicated transmitter or a transceiver. The transmitter 125 is connected to the antenna 135.

The antenna 135 transmits a signal containing the information downstream to a subscriber 110. The antenna 135 may be one antenna or multiple antennas. The antenna 135 has a downstream transmit antenna pattern. The antenna pattern may be formed, for example, by a Butler Matrix or a phased array design.

Signals containing information to be sent upstream from a subscriber 110 to the base station 105 are received by the antenna 135, which also has an upstream receive antenna pattern that may be formed, for example, by a Butler Matrix or a phased array design. The antenna 135 is connected to a receiver 130, which receives the signal and may, for example, perform amplification or demodulation of the signal.

The receiver 130 may be a dedicated receiver or a transceiver, and is connected to the signal processing equipment 120. The signal processing equipment 120 may perform, for example, demodulation, modulation, frequency conversion, encryption, decryption, or other actions necessary to prepare a signal for transmission over the network 115.

The transmitter 125 and the receiver 130, or a transceiver, may be connected to one antenna or multiple antennas. The transmitter 125 and the receiver 130 may share the same antenna or group of antennas, or, alternatively, may use separate antennas or groups of antennas. For example, the transmitter 125 may be connected to a single antenna or multiple antennas, and the receiver 130 may be connected to a different single antenna or multiple antennas.

The subscriber 110 may include an antenna 140, a receiver 145, signal processing equipment 150, information processing device 155, and a transmitter 160. A transceiver may replace the separate transmitter 145 and receiver 160.

Signals containing information sent downstream from a base station 105 to the subscriber 110 are received by the antenna 140, which may be one antenna or multiple antennas. The antenna 140 is connected to the receiver 145, which receives the signal, and may perform, for example, amplification or demodulation of the signal before sending the signal to the signal processing equipment 150. The signal processing equipment 150 may perform, for example, demodulation, modulation, frequency conversion, encryption, decryption, or other actions necessary to prepare a signal for transmission to the information processing device 155.

The information processing device 155 is connected to the signal processing equipment 150 and may, for example, display, store, edit, or otherwise manipulate the information sent from the network 115. The information processing device 155 may be, for example, a personal computer, a microprocessor, a digital computer, a television set, a set top box, a telephone, a speaker, a cathode ray tube, or another display, computing, or storage device.

For upstream transmission of information from the subscriber 110 to the network 115, the signal processing equipment 150 receives the data from the information processing device 155. The signal processing equipment 150 may perform, for example, demodulation, modulation, frequency conversion, encryption, decryption, or other actions to prepare a signal for transmission by the transmitter 160 to which the signal processing equipment 150 is connected. The transmitter 160 may, for example, amplify the signal or perform modulation, and is connected to the antenna 140, which transmits a signal containing the information upstream to a base station 105.

Figure 2:
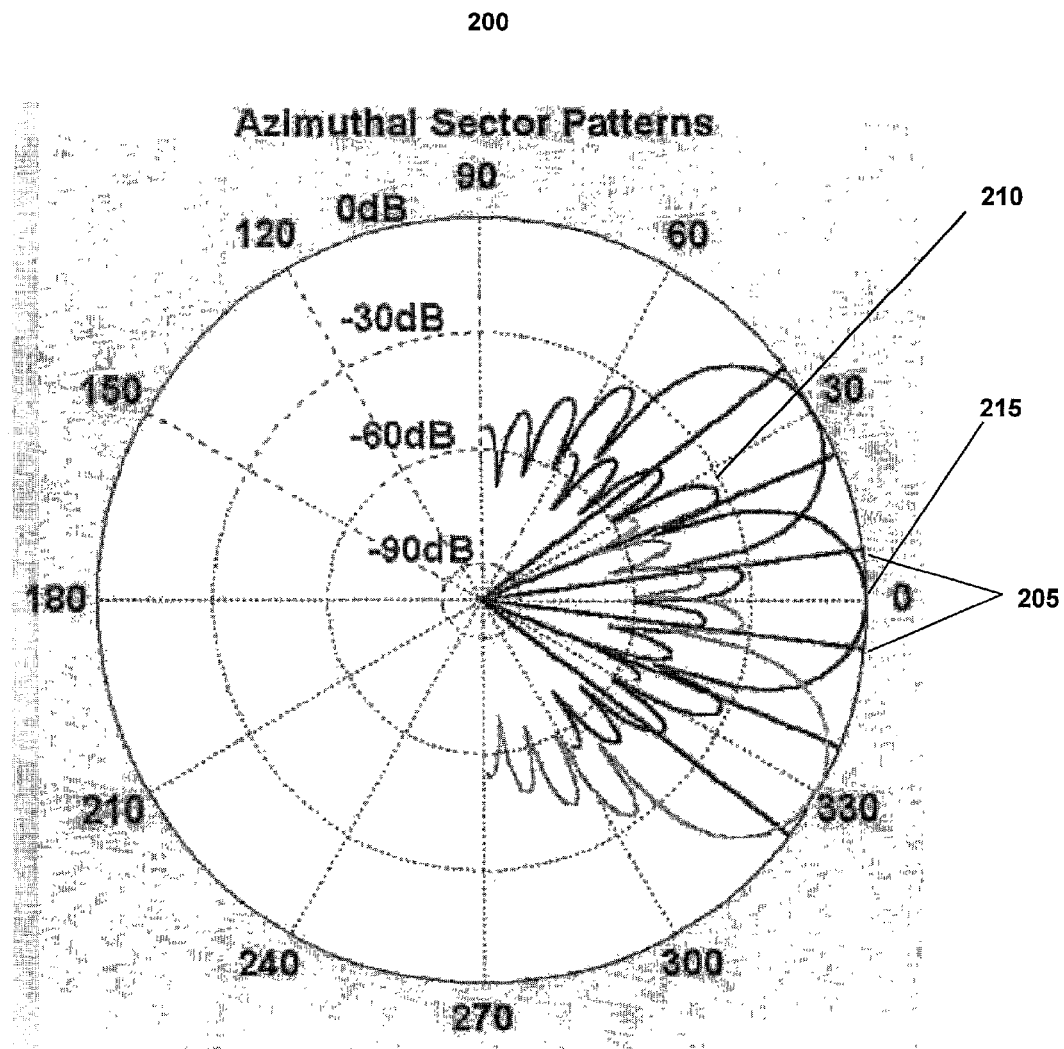
FIG. 2 is an azimuthal sector antenna pattern for a downstream antenna.

As shown in FIG. 2, an antenna pattern 200 for downstream transmission by a base station is partitioned into azimuthal sectors 205. The antenna pattern 200 may be formed by a single antenna, such as, for example, a Butler Matrix, or by multiple antennas, such as, for example, a phased array. In the example of FIG. 2, the azimuthal sectors 205 are 15 degrees and there are 24 sectors in 360 degrees of coverage. The azimuthal sectors 205 of the example of FIG. 2 have a frequency reuse factor ("K") of 2, such that adjacent beams alternate in frequency. This additional beam-forming with 24 sectors over 360 degrees and a frequency re-use factor of 2 allows for approximately a six-fold increase in capacity for the downstream transmissions over an omni-directional antenna pattern without frequency reuse.

Even greater capacity increases may be achieved by allocating more bandwidth to areas of greater subscriber density. Assuming that traffic requirements are not uniform, but instead may vary by a factor of two or more over different areas, the flexibility in allocating frequencies may achieve another two-fold capacity improvement.

The sidelobe levels 210 of the sector beams 215 are an important design consideration in the antenna pattern 200 of FIG. 2, and depend upon, among other factors, the type of signal being transmitted downstream. For example, the sidelobe levels 210 should be approximately 33 dB to support transmission of 64-Quadrature Amplitude Modulation ("QAM") signals. A 33 dB sidelobe level represents near state of the art in array sidelobe design. Another example is a sidelobe level of approximately 27 dB for a 16-QAM signal. Antennas with 27 dB sidelobe levels are readily found in the marketplace today. The sector beams 215 of the implementation shown in FIG. 2 have 30 dB sidelobes 210.

The sectorized beams 215 for downstream transmission also has a widened elevation beamwidth as compared to current downstream transmit antenna elevation beamwidths. The elevation beamwidth is widened due to a roll-off in the gain of the main beam as a subscriber comes closer to the base station transmitter. If the beam has a wider elevation beamwidth, the SNR does not roll-off as quickly with decreasing subscriber distance to the base station transmitter. Widening of the elevation beamwidth also helps to simplify installation procedures, and may even allow the subscriber to install an antenna indoors by providing more signal margin for wall penetration.

For example, present antennas may typically have an elevation beamwidth of approximately 8 degrees, and the sectorized beams 215 are widened in elevation beyond 8 degrees. For example, the sectorized beams 215 may be widened to approximately 15–20 degrees in elevation in order to provide full gain to subscribers located anywhere from very near the base station transmitter out to the maximum radius of the service area. Also, to achieve greater gain and SNR margin, the downstream antenna pattern may be partitioned into elevation sectors as shown in FIG. 3 and described below with respect to the upstream antenna pattern.

The downstream antenna pattern control in azimuth and elevation may be accompanied by an increase in transmitter Effective Isotropic Radiated Power (EIRP) to the FCC MMDS authorized limit, which is currently 69 dBW per 6 MHz.

Figure 3:
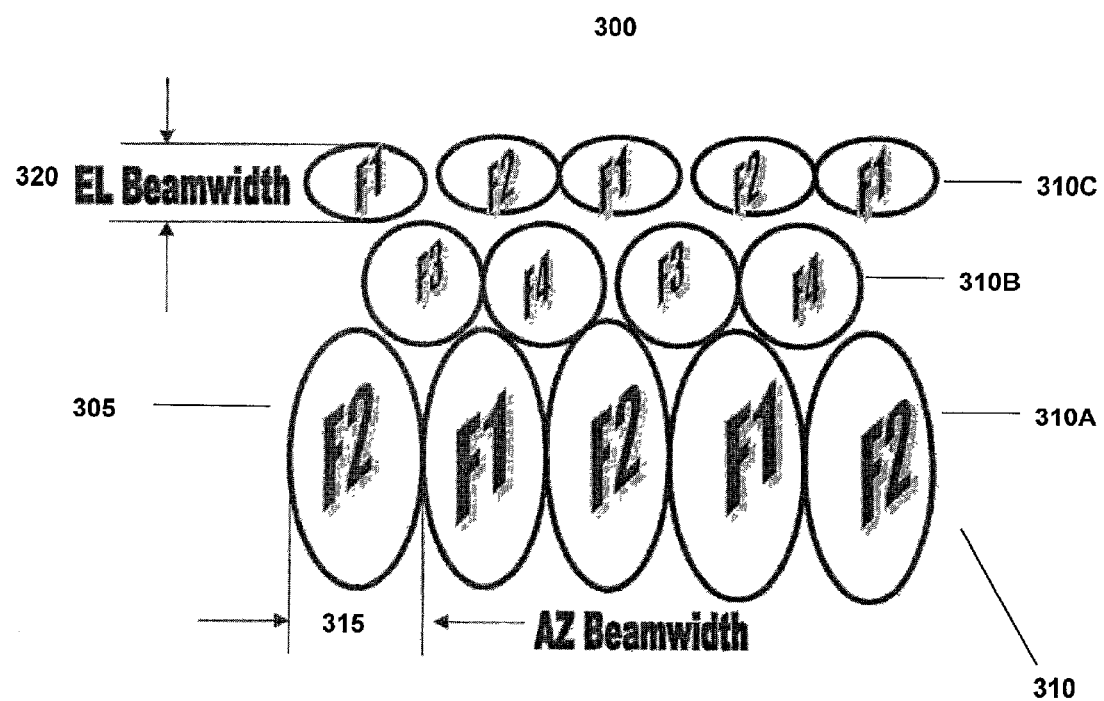
FIG. 3 is a beam pattern for an upstream antenna.

As shown in FIG. 3, an upstream receive antenna beam pattern 300 for a base station is formed of multiple beams 305, each having an azimuth beamwidth 315 and an elevation beamwidth 320. The beams 305 are arranged in more than one elevation sector 310, and use a pattern of non-overlapping frequency bands between adjacent elevation sectors 310. The beam pattern 300 may be formed by a single antenna, such as, for example, a Butler Matrix, or by multiple antennas, such as, for example, a phased array. In the example of FIG. 3, there are three elevation sectors 310A, 310B, and 310C. The azimuthal beamwidth 315 is 15 degrees and there are four non-overlapping frequency bands (i.e., K=4), F1, F2, F3, and F4, that may be allocated to any given beam. Thus, there are a total of 36 beams over 180 degrees of azimuthal coverage, or 72 beams over 360 degrees of azimuthal coverage.

The bottom-most elevation sector 310A has adjacent beams using an alternating pattern of frequencies F1 and F2 in azimuth. The middle elevation sector 310B has adjacent beams using an alternating pattern of frequencies F3 and F4 in azimuth. The top-most elevation sector 310C has adjacent beams using an alternating pattern of frequencies F1 and F2 in azimuth. This antenna pattern offers a 12-fold increase in capacity compared to a sectorized azimuthal antenna pattern with 15 degree sectors, K=2 frequency reuse, and only one elevation sector. The additional gain and SNR margin afforded by the beam pattern 300 allows a lower cost, non-LOS installation at a significantly greater number of subscriber locations.

Figure 4:
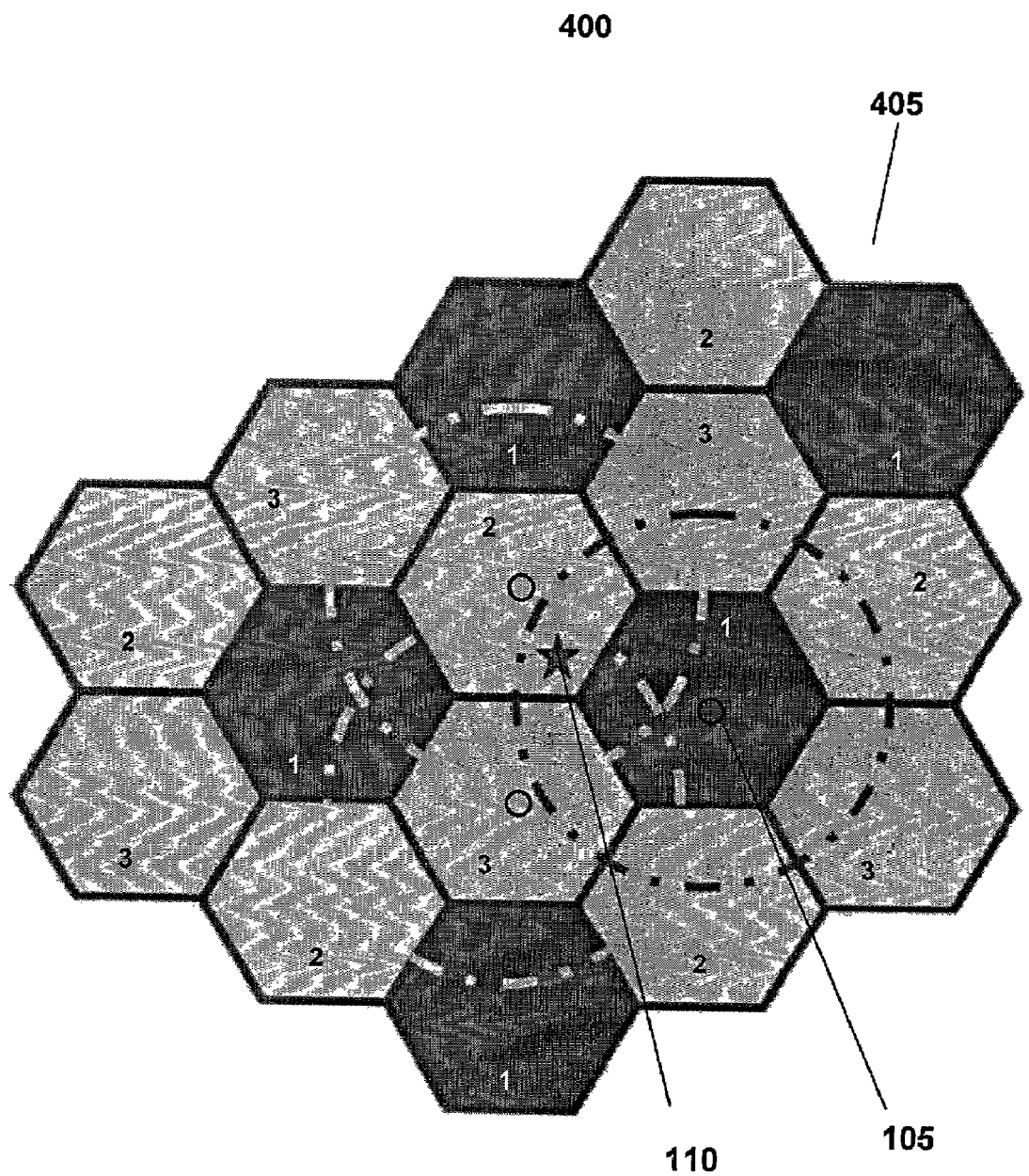
FIG. 4 is a cellular configuration.

FIG. 4 shows the concepts described above with respect to FIGS. 1–3 extended to a larger cellular deployment. In particular, FIG. 4 shows a cellular pattern 400 made from a collection of individual cells 405 having K=3 frequency reuse. Each cell 405 contains a base station 105 near the center of the cell 405. The base station 105 in each cell 405 may use the downstream beam pattern 200 of FIG. 2 and/or the upstream beam pattern 300 of FIG. 3. The three frequency bands 1, 2, 3 shown in FIG. 4 are further split up into sectors (not shown) formed by the different beam patterns for upstream and downstream transmission, as shown in FIGS. 2 and 3.

If the cell radius is equal to D, then the design range of the cell is approximately 1.5D. The design range is the range at which the signal margin is approximately zero. The approximate design range of the signal from three base station locations is shown by dotted lines in FIG. 4. The subscriber 110 has the option of using any one of the 3 base stations that overlap in coverage at the subscriber's location. Thus, overlap of coverage patterns from the base stations can provide increased coverage and increased capacity. Overlapped coverage patterns can be mitigated by having directional beams on the receive antenna 140 at the subscriber location 110, which may include adaptive beams that combine signals and reject unwanted signals. These directional beams, including those formed using adaptive beamforming techniques, can be used at the subscriber location 110 to take advantage of overlapping beams in the cellular structure for diversity improvement and rejection of unwanted signals. Further, using elevation and azimuth sectoring in the upstream transmission and azimuth sectoring in the downstream with frequency reuse helps to increase capacity, increase gain, and increase SNR margin for the signals. This, in turn, may provide for non-LOS operation and indoor or window sill area installation.

Since the design range of the cell is greater than the cell radius, there is a chance that there may be co-channel interference from neighboring cells using the same set of frequencies. Co-channel interference may be minimized by, among other things, choosing the cell radius to provide sufficient distance between base stations using the same set of frequencies. For example, if the design range of a cell is 20 miles, then D=20 miles/1.5=13.3 miles. The additional cellular capacity from re-use of frequency over the 20 mile cell is $1.5^2$, or an approximately 2.25 time increase. There is a cost associated with building additional base stations. However, coverage would be improved because there would be more base stations available, and the likelihood of having a base station available from a given window sill or window of a computer room is much greater with multiple base stations available than if there is only one base station that is able to service a subscriber 110.

Because there is a loss of 3X in capacity due to cellularization, the cell radius should be chosen to be slightly smaller than discussed above. For example, in the implementation described above, where the design range, D, is 20 miles, the radius to offset the 3X loss (and increase the capacity back 3X vs. 2.25X discussed above) is equal to $D/\sqrt{3}$=11.6 miles. The cell radius should not be made too small, as there is an increased potential for co-channel interference as the cell radius shrinks. The likelihood of co-channel interference may be reduced through proper subscriber antenna directionality or modified sidelobe rejection design.

A number of implementations have been described. Nevertheless, it will be understood that various modifications may be made. For example, in order to form the upstream beam pattern and/or the downstream beam pattern, a single antenna may be used with, for example, a Butler Matrix, or, alternatively, multiple separate antennas may be used. Adaptive beam forming techniques, which are well known in the art, may be used in forming the upstream beam pattern or the downstream beam pattern. A transceiver may be substituted for a transmitter, a receiver, or both. Any combination of azimuthal sector or elevation sector, or both, may be used for the downstream antenna pattern or the upstream antenna pattern. Also, for example, the sector sizes, the elevation beam widths, the number of upstream elevation sectors, the side lobe levels, and the frequency reuse factor may all be varied. Accordingly, other implementations are within the scope of the following claims.

What is claimed is:

1. A base station for a wireless communication system, the base station comprising:
   an antenna system configured to provide a downstream transmit pattern partitioned into azimuthal sectors and an upstream receive pattern partitioned into azimuthal sectors and elevation sectors, wherein the upstream receive pattern elevation sectors are configured in a pattern of non-overlapping frequency bands between adjacent elevation sectors;
   a transmitter connected to the antenna system to transmit a signal to a subscriber using the downstream transmit pattern; and a receiver connected to the antenna system and configured to receive a signal from the subscriber using the upstream receive pattern.

2. The base station of claim 1 wherein the downstream transmit pattern further comprises a downstream transmit pattern partitioned into elevation sectors.

3. The base station of claim 2 wherein the downstream transmit pattern elevation sectors comprise three elevation sectors.

4. The base station of claim 1 wherein the downstream transmit pattern further comprises a frequency reuse factor of at least 4.

5. The base station of claim 1 wherein each downstream transmit pattern azimuthal sector comprises an approximately 15 degree sector.

6. The base station of claim 1 wherein the downstream transmit pattern further comprises a frequency reuse factor of at least 2.

7. The base station of claim 1 wherein the transmitter and antenna system are configured to generate a downstream EIRP in at least one sector of approximately 69 dBW/6 MHz.

8. The base station of claim 1 wherein the downstream transmit pattern further comprises an elevation beam width greater than 8 degrees.

9. The base station of claim 8 wherein the elevation beam width is between approximately 15 degrees and approximately 20 degrees.

10. The base station of claim 1 wherein the downstream transmit pattern azimuthal sector further comprises a sidelobe level of at least 33 dB.

11. The base station of claim 1 wherein the downstream transmit pattern azimuthal sector further comprises a sidelobe level of at least 27 dB.

12. The base station of claim 1 wherein each upstream receive pattern azimuthal sector comprises an approximately 15 degree sector.

13. The base station of claim 1 wherein the upstream receive pattern elevation sectors comprise three elevation sectors.

14. The base station of claim 1 wherein the upstream receive pattern further comprises a frequency reuse factor of at least 4.

15. The base station of claim 1 wherein the antenna system comprises one antenna configured to provide the downstream transmit pattern and the upstream receive pattern.

16. The base station of claim 1 wherein the antenna system comprises a first antenna configured to provide the downstream transmit pattern and a second antenna configured to provide the upstream receive pattern.

17. A base station for a wireless communication system, the base station comprising:
a transmit antenna configured to provide a downstream transmit pattern partitioned into azimuthal sectors and elevation sectors, wherein the downstream transmit pattern elevation sectors are configured in a pattern of non-overlapping frequency bands between adjacent sectors and each elevation sector is offset azimuthally from an adjacent elevation sector; and
a transmitter connected to the transmit antenna to transmit a signal to a subscriber using the downstream transmit pattern.

18. The base station of claim 17 wherein the downstream transmit pattern elevation sectors comprise three elevation sectors.

19. The base station of claim 17 wherein the downstream transmit pattern further comprises a frequency reuse factor of at least 4.

20. The base station of claim 17 wherein each downstream transmit pattern azimuthal, sector comprises an approximately 15 degree sector.

21. The base station of claim 17 wherein the downstream transmit pattern further comprises a frequency reuse factor of at least 2.

22. The base station of claim 17 wherein the transmitter and transmit antenna are configured to generate a downstream EIRP in at least one sector of approximately 69 dBW/6 MHz.

23. The base station of claim 17 wherein the downstream transmit pattern further comprises an elevation beam width greater than 8 degrees.

24. The base station of claim 23 wherein the elevation beam width is between approximately 15 degrees and approximately 20 degrees.

25. The base station of claim 17 wherein the downstream transmit pattern azimuthal sector further comprises a sidelobe level of at least 33 dB.

26. A base station for a wireless communication system, the base station comprising:
a transmit antenna configured to provide a downstream transmit pattern partitioned into elevation sectors that are configured in a pattern of non-overlapping frequency bands between adjacent elevation sectors land each elevation sector is offset azimuthally from an adjacent elevation sector; and
a transmitter connected to the transmit antenna to transmit a signal to a subscriber using the downstream transmit pattern.

27. The base station of claim 26 wherein the downstream transmit pattern elevation sectors comprise three elevation sectors.

28. The base station of claim 26 wherein the downstream transmit pattern further comprises a frequency reuse factor of at least 4.

29. A base station for a wireless communication system, the base station comprising:
a receive antenna configured to provide an upstream receive pattern partitioned into azimuthal sectors and elevation sectors, wherein the elevation sectors are configured in a pattern of non-overlapping frequency bands between adjacent elevation sectors; and
a receiver connected to the receive antenna and configured to receive a signal from a subscriber using the upstream receive pattern.

30. The base station of claim 29 wherein each upstream receive pattern azimuthal sector comprises an approximately 15 degree sector.

31. The base station of claim 29 wherein the upstream receive pattern elevation sectors comprise three elevation sectors.

32. The base station of claim 29 wherein the upstream receive pattern further comprises a frequency reuse factor of at least 4.

33. A base station for a wireless communication system, he base station comprising:
a receive antenna configured to provide an upstream receive pattern partitioned into elevation sectors, wherein the elevation sectors are configured in a pattern of non-overlapping frequency bands between adjacent elevation sectors; and a receiver connected to the receive antenna and configured to receive a signal from a subscriber using the upstream receive pattern.

34. The base station of claim 33 wherein the upstream receive pattern elevation sectors comprise three elevation sectors.

35. The base station of claim 33 wherein the upstream receive pattern further comprises a frequency reuse factor of at least 4.

36. A cellular communication system comprising cells, each of which includes a base station comprising:
   an antenna system configured to provided a downstream transmit pattern partitioned into azimuthal sectors but not elevation sectors and an upstreams receive pattern partitioned into azimuthal sectors and elevation sectors, wherein the upstream receive pattern elevation sectors are configured in a pattern of non-overlapping frequency bands between adjacent elevation sectors;
   a transmitter connected to the antenna system to transmit a signal to a subscriber using the downstream transmit pattern; and
   a receiver connected to the antenna system and configured to receive a signal from the subscriber using the upstream receive pattern.

37. The system of claim 36 further comprising a cell frequency reuse factor of at least 3.

38. The system of claim 37 further comprising a cell radius approximately equal to a design range of the cell divided by the square root of 3.

39. The system of claim 36 further comprising a cell radius approximately equal to design range of the cell divided by 1.5.

40. The system of claim 36 further comprising a subscriber antenna configured to receive the signal from the base station.

41. The system of claim 40 wherein the subscriber antenna further comprises a directional receive antenna pattern.

42. The system of claim 41 wherein the directional receive antenna pattern is formed using adaptive beamforming.

43. The cellular communication system of claim 36, wherein the upstream received pattern is partitioned into three elevation sectors.

44. A cellular communication system comprising cells, each of which includes a base station comprising:
   an antenna system configured to provide a downstream transmit pattern partitioned into elevation sectors and an upstream receive pattern partitioned into azimuthal sectors, wherein the downstream transmit pattern elevation sectors are configured in a pattern of on-overlapping frequency bands between adjacent elevation sectors and each elevation sector is offset azimuthally from an adjacent elevation sector;
   a transmitter connect to the antenna system to transmit a signal to a subscriber using the downstream transmit pattern; and
   a receiver connected to the antenna system and configured to receive a signal from the subscriber using the upstream receive pattern.

45. The system of claim 44 further comprising a cell frequency reuse factor of at least 3.

46. The system of claim 44 further comprising a cell radius approximately equal to design range of the cell divided by the square root of 3.

47. The system of claim 44 further comprising a cell radius approximately equal to a design range of the cell divided by 1.5.

48. The system of claim 44 further comprising a subscriber antenna configured to receive the signal from the base station.

49. The system of claim 48 wherein the subscriber antenna further comprises a directional receive antenna pattern.

50. The system of claim 49 wherein the directional receive antenna pattern is formed using adaptive beamforming.

51. The cellular communication system of claim 44, wherein the downstream transmit pattern is partitioned into three elevation sectors.

* * * * *